UNITED STATES PATENT OFFICE.

LOUIS TERRY, OF PINE BLUFF, ARKANSAS, ASSIGNOR OF ONE-FOURTH TO EDWIN J. KERWIN, ONE-FOURTH TO ELIZABETH THOMPSON, AND ONE-FOURTH TO MARY E. STEELE, ALL OF PINE BLUFF, ARKANSAS.

INSECTICIDE AND PROCESS OF PREPARING SAME.

1,153,974.  Specification of Letters Patent.  Patented Sept. 21, 1915.

No Drawing.   Application filed March 25, 1914.  Serial No. 827,086.

*To all whom it may concern:*

Be it known that I, LOUIS TERRY, a citizen of the United States, residing at Pine Bluff, in the county of Jefferson and State of Arkansas, have invented certain new and useful Improvements in Insecticides and Processes of Preparing Same, of which the following is a full, clear, and exact specification.

This invention relates to a composition of matter designed and adapted to kill insects of various kinds, and to the method of preparing such insecticide. This composition is especially designed as a means of exterminating the boll weevil which menaces the cotton crop, but is also useful in destroying other insect pests, such as attack fruits, trees, plants, vines and vegetables.

The object of the invention is to produce a composition which will positively kill these insects in the egg as well as in the full growth and which may be easily and inexpensively prepared and applied.

In preparing the insecticide, the following ingredients are used in the proportions specified: 12 pounds of tobacco, of any preferred brand; 2 pounds of soda, of any preferred brand, 65 gallons of water. It will be understood that this formula is given as an example and that larger or smaller quantities of the compound may be prepared by varying the amounts of the different ingredients as long as their proportions are maintained.

The tobacco and soda are put into the water and boiled for approximately one hour and a half, care being taken to stir it well while boiling. The tobacco is then pressed to extract the essence thereof which it contains after the boiling. The resulting liquid compound will measure approximately sixty gallons, five gallons being lost during the boiling period.

For killing the egg or the adult of the boll weevil in the cotton seed before planting, the seed is first mixed with dry earth, preferably light loam, and the liquid compound prepared in accordance with my invention is then poured over this mixture and the whole rubbed well together. An ordinary hoe may be used to advantage in effecting this mixing and rubbing which is continued until the mixture is in a semi-solid or plastic state and has a muddy appearance. This mixture is left in a stack or heap for a day and a night, during which the seeds go through a sweating process which causes them to swell soon after planting. The next day the seeds should be planted and in no instance should they be kept more than two days after going through this sweating process because my preparation causes them to sprout almost immediately. During this process of treating the seed with my compound the egg and adult of the boll weevil are absolutely killed as well as all other insect life which might have a harmful effect upon the seed or plant.

If when the cotton plant is growing boll weevil are found in any state, they may be exterminated by using my liquid compound as a spray. This spray will also kill any other worm or insect found on the plant, including the bug known as the "sharpshooter" which is as much feared in some localities as the boll weevil. Actual tests have shown that insects of the kinds referred to will be killed in thirteen seconds after being struck by my compound.

Used as a spray, my compound is also efficacious for killing all kinds of insects, bugs, and worms that infest fruit trees and vines, vegetables and flowering plants and bushes. In applying the remedy to rose bushes care should be taken to thoroughly spray the stalk as well as the leaves and buds.

Although the compound is sure death to all destructive insects, it is absolutely harmless to the cotton boll, to fruits, vegetables or flowers, and also to man or beast.

Having thus described my invention, what I claim as new and desire to secure by Letters Patent of the United States is:

1. The process of preparing a liquid insecticide which consists in combining tobacco, soda and water, in substantially the proportions specified, *i. e.*, twelve pounds of tobacco, two pounds of soda and sixty-five gallons of water, boiling the mixture until the liquid therein is reduced approximately eight per cent., and expressing the liquid from the resulting mass.

2. A liquid insecticide resulting from the boiling of tobacco, soda and water, in substantially the proportions specified, i. e., twelve pounds of tobacco, two pounds of soda and sixty-five gallons of water, until the liquid in the mixture is reduced approximately eight per cent., substantially as described.

In testimony whereof I have signed my name to this specification in the presence of two attesting witnesses.

LOUIS TERRY.

Witnesses:
E. J. KERWIN,
CREED CALDWELL.